Sept. 30, 1969  C. BLOCH ETAL  3,470,397
COMBUSTION PLANTS, NOTABLY FOR GENERATORS OF ELECTRIC
CURRENT BY MAGNETO HYDRODYNAMIC EFFECT
Filed Jan. 9, 1967  3 Sheets-Sheet 1
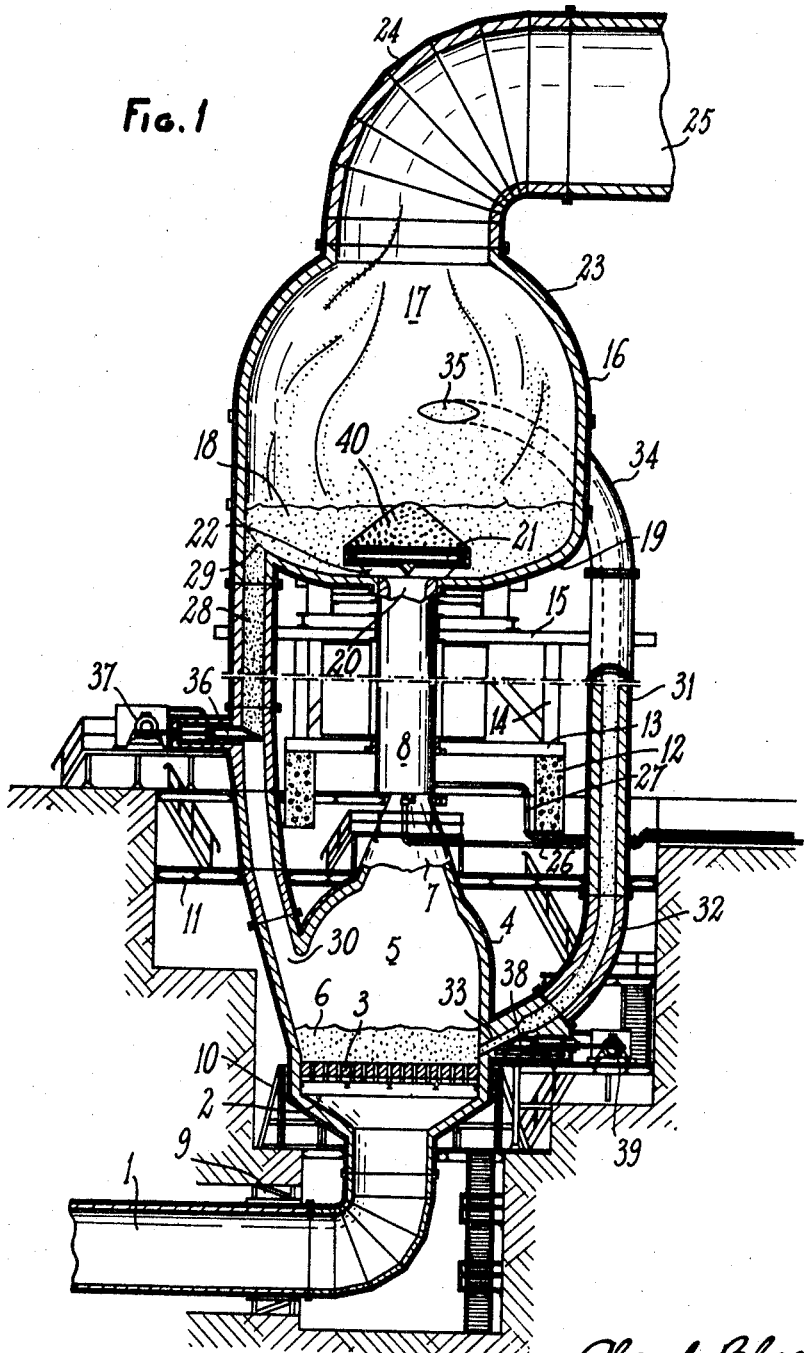

Sept. 30, 1969  C. BLOCH ETAL  3,470,397
COMBUSTION PLANTS, NOTABLY FOR GENERATORS OF ELECTRIC
CURRENT BY MAGNETO HYDRODYNAMIC EFFECT
Filed Jan. 9, 1967  3 Sheets-Sheet 2
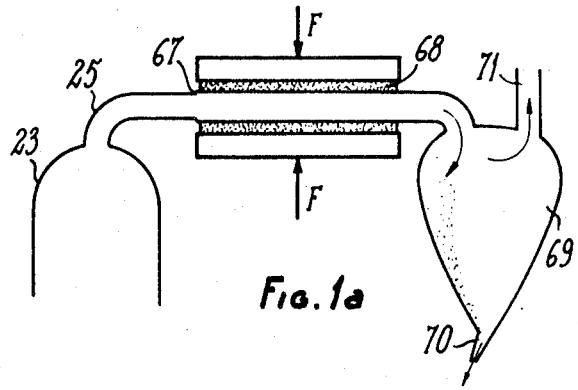
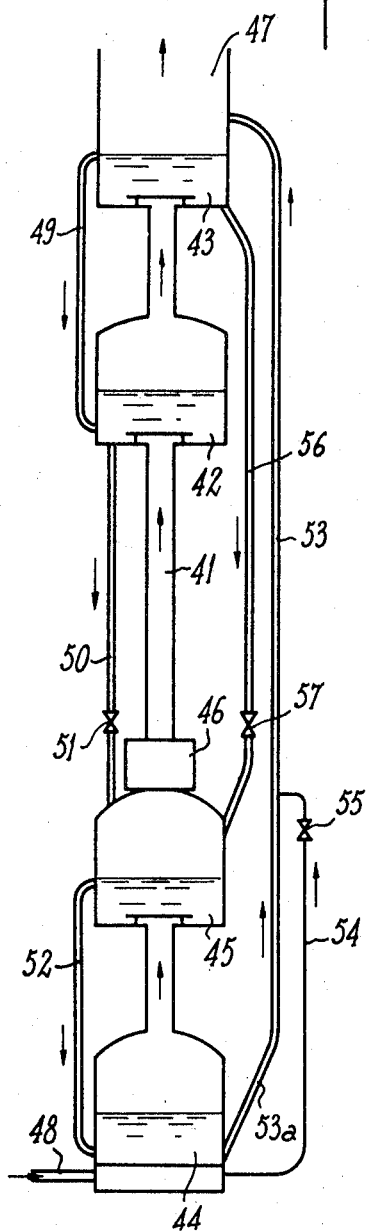
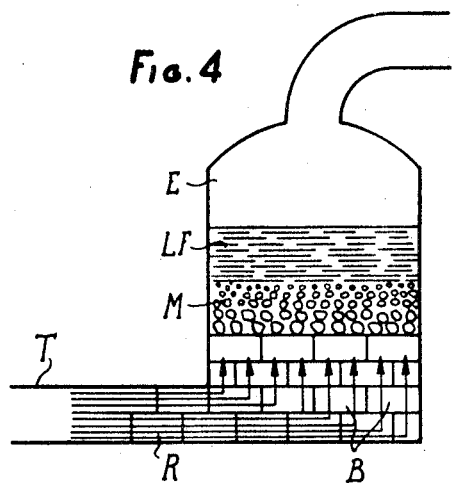
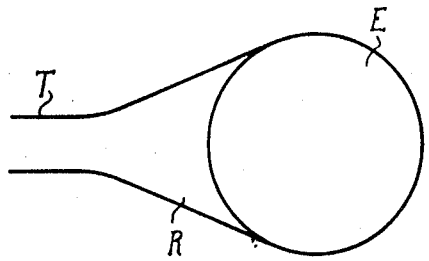

United States Patent Office 3,470,397
Patented Sept. 30, 1969

3,470,397
COMBUSTION PLANTS, NOTABLY FOR GENERATORS OF ELECTRIC CURRENT BY MAGNETO HYDRODYNAMIC EFFECT
Claude Bloch, Sevres, Gérard Gosse, Paris, and Michel Tamalet, Rueil-Malmaison, France, assignors to Societe Anonyme Heurtey, Paris, France
Filed Jan. 9, 1967, Ser. No. 608,165
Claims priority, application France, Jan. 11, 1966, 45,445, 45,446; Aug. 25, 1966, 74,114
Int. Cl. G21d 7/02; H02k 45/00
U.S. Cl. 310—11                    20 Claims

ABSTRACT OF THE DISCLOSURE

The heat produced by the combustion products is taken from a fluidized bed at the outlet of the combustion plant, the component particles of said first fluidized bed being transferred to a second fluidized bed disposed at the inlet of the plant, at least the combustion agent being caused to pass through said second fluidized bed and the particles transferred back from said second bed to said first bed.

---

In power and like plants wherein a natural combustion is produced the temperature attained by the flames cannot exceed a predetermined limit. To increase the combustion temperature a strong pre-heating of the combustion air may be contemplated before introducing it into the combustion zone. It is also possible to increase the proportion of oxygen in the air but this enrichment constitutes a heavy cost factor in the final energetic asset. Therefore, it is particularly beneficial to improve the heat-recovery efficiency.

It is known that the operation of a generator of electric current operating according to the magneto-hydro-dynamic coversion process requires the use of a highly ionised fluid. Furthermore, it is also adequate, in converters of this character (designated hereinafter by the abbreviation "MHD converter"), to strongly compress the combustion agent in order to obtain a high-temperature combustion with very high flow rates.

However, in practice the use of high temperatures is limited to values of the order of 3,000° K. by the resistance of the blast-pipe material and also by the magnitude of parietal losses. At such temperature and pressure values the use of metal-walled heat regenerators is obviously precluded.

On the other hand, at these temperatures the rate of ionisation of the combustion gases in an MHD generator would not be sufficient if they were not sowed or inseminated with a so-called seed material easily ionisable at these temperatures, such as an alkaline metal or one of its salts. The injection of this seed into gases is termed "insemination," the reverse operation being referred to as the "de-insemination."

Under these conditions, an industrially economical conversion requires not only the recovery of the residual enthalpy at the outlet end of the tuyere but also the recycling of the seed.

It will thus be seen that the plant for generating electric current by such a conversion implies:

(1) The obtaining of the high necessary temperatures by means of conventional fuels and combustion agents;

(2) As a consequence of the seeding of the combustion products, the recovery, for recycling purposes, of the seed material while avoiding the corrosive effects likely to be produced by such ionising materials at these high temperatures.

It is the essential object of the present invention to meet this twofold requirement.

To this end, the present invention proposes utilizing the properties of fluidized beds, namely:

The increment of the heat-transfer surface area, in order to reduce the volume of the regenerators;

The homogeneity of the temperatures, whereby the smoke temperature can be reduced immediately;

The considerably easier circulation of the particles.

Therefore, this invention relates to a method of heat recovery or thermal regeneration and dissemination notably for combustion plants and more particularly in electric current generators operating according to the magnetohydrodynamic effect, whereby the heat produced by the combustion products is taken from a fluidized bed at the outlet of the combustion plant, the component particles of said first fluidized bed being transferred to a second fluidized bed disposed at the inlet of the plant, at least the combustion agent being caused to pass through said second fluidized bed and the particles transferred back from said second bed to said first bed.

When the combinations of the seed and the combustion gas yield a product which, in the liquid phase, has a corrosive behaviour with respect to refractories, the de-insemination of the combustion gases is obtained at the outlet of said first fluidized bed by effecting a very rapid tempering of these products which is adapted to convert them almost instantaneously from the gaseous state to the solid state, preferably in the pulverulent form, which is subsequently separated in a cyclone or any other suitable type of separator.

According to a specific form of embodiment of the method of this invention, two fluidized beds are disposed at different levels, preferably with a substantially vertical mutual arrangement, and the particles are circulated by gravity, downwardly, in the form of a dense column and upwardly in a phase diluted by a sufficient gaseous output.

The geometrical disposal of the orifices through which the particles are respectively picked up from, and returned to, the two beds, and the outputs in the aforesaid columns, are calculated with a view to obtain the above-described effect, that is, maintaining the movable state in one bed and producing an upward removal in the other.

In a specific form of embodiment suitably cooled valve means are provided in the columns interconnecting the two fluidized beds for adjusting the particle outputs.

In another specific form of embodiment a single valve per duct is sufficient if the height of the columns is adequate.

In a different form of embodiment at least two superposed valves adapted to constitute a lock section, notably in the case of columns of relatively moderate height, are provided more particularly in the return column for the dense-phase particles.

Regulation means are also provided for reacting upon said valve means and ensure a stable circulation of the particles precluding any unpriming.

In the upper fluidized bed a bladed diffuser is provided for impressing a rotary motion to the bed particles in order to homogenize the temperature therein.

When the fluidized bed, notably the lower one, operates under a relatively high pressure it is advantageous that the enclosure containing same be provided with a double-walled structure or jacket means permitting the circulation of a cold fluid such as air or the combustion agent as a rule between the walls, in order to transfer the stress-strain effects to a cool external wall while permitting, if need be, the recovery of heat losses from the fluidized bed.

The device for diluting the combustion products by means of a relatively cold fluid consists, according to this invention, of a kind of flue provided with pervious refractory walls along which the combustion products charged with seeding substances are circulated, the cold fluid being blown through said refractory walls for directly converting said substances from the gaseous state to the solid state, without any aggressiveness, while avoiding any sticking thereof to the wall.

With these arrangements, requiring but relatively reduced volumes with respect to conventional heat-transfer arrangements, particularly high rates of heat transfer are obtainable. In each heat-transfer unit the temperatures are homogeneous. The heat cycle applied to each particle is of relatively low amplitude and thus conventional refractories can be used for constructing these heat transfer units and constituting said particles.

In addition to the methods and device broadly set forth hereinabove for accomplishing on the one hand a heat recovery and on the other hand a de-insemination of the combustion products for recycling purposes, this invention is also concerned with a novel method and an improved device whereby both operations can be carried out simultaneously.

To this end and according to this invention the heat from the combustion products is taken from a first series of fluidized beds at the outlet of the converter tuyere and the component particles of the fluidized beds of said particles are transferred into a second series of fluidized beds disposed at the inlet end of said blast-pipe before the burner thereof, the combustion air is caused to flow through the fluidized beds of said second series before introducing said combustion air into the burner, the particles of the fluidized beds of said second series are transferred back into the fluidized beds of said first series and simultaneously with this heat recovery the seed is condensed on the particles of one of the fluidized beds of said first series, transferred into one of the fluidized beds of said second series so as to be re-heated and vaporized therein whereafter it is re-introduced into said tuyere.

This invention is also concerned with devices for carrying out the method set forth hereinabove.

According to a specific form of embodiment of this device, applicable notably to an MHD converter disposed vertically, said first series consists of two fluidized beds disposed substantially vertically at different levels, said second series comprises two fluidized beds with a relative arrangement similar to that of said first series, and the circulation of particles between the various beds is obtained by gravity in the downward direction and with the assistance of a valve-controlled supply of compressed air in the upward direction.

The inlet of the column for circulating the particles downwards from the upper fluidized bed to the lower fluidized bed of said first series is disposed in the upper portion of the enclosure containing the upper bed, the outlet of this column being disposed beneath the level of the lower bed, the particles fluidized in the bottom of said column compensating the pressure differential produced between the inlet and outlet ends of said column and limiting the smoke leakage output.

According to another feature characterizing this invention, the inlet of the column for circulating the particles between the lower fluidized bed of the first series and the upper bed of the second series is located beneath the level of said lower bed and its outlet is located above said upper bed, a valve being interposed in this column to limit the particle output.

The particles are transferred from the upper fluidized bed of the second series to the lower bed thereof by means of an operating column similar to the one interconnecting the fluidized beds of the first series.

According to another form of embodiment of the device of this invention, the latter is applied to an MHD converter tuyere disposed horizontally. In this specific form of embodiment the lower ends of the vertical portions of the columns for circulating the particles respectively between the fluidized beds of the first series and the upper fluidized bed of the second series are interconnected by sections in which the particles are entrained in diluted phase by a suitable injection of compressed air.

This invention also contemplates a specific form of construction of diffusers for the fluidized beds, notably those of the first series subjected to the very high temperatures of the smokes issuing from the converter tuyere.

According to this invention the parallelepipedic cross-sectional contour of the tuyere merges into the cylindrical cross-sectional contour of the enclosure containing the fluidized bed of which the lower portion consists of a honeycomb structure of refractory bricks covered with a loosely deposited layer of refractory material of a granulometry decreasing gradually towards the upper portion of the fluidized bed.

In order to afford a clearer understanding of this invention and of the manner in which the same may be carried out in practice, various possible forms of embodiment thereof will now be described by way of example with reference to the attached drawings, in which:

FIG. 1 is a vertical axial section with parts broken away, illustrating the mutual disposal of regenerating heat-transfer units on either side of a vertical MHD converter;

FIG. 1a illustrates diagrammatically the arrangement contemplated for separating the seed from the combustion products for recycling the former;

FIG. 2 illustrates diagrammatically a heat recovery unit adapted simultaneously to recycle the seed, this unit being associated with a vertical MHD converter;

FIGS. 4 and 5 illustrate respectively in elevational view and vertical and plan view a specific form of embodiment of a diffuser of fluidized bed according to this invention.

Figure 3:
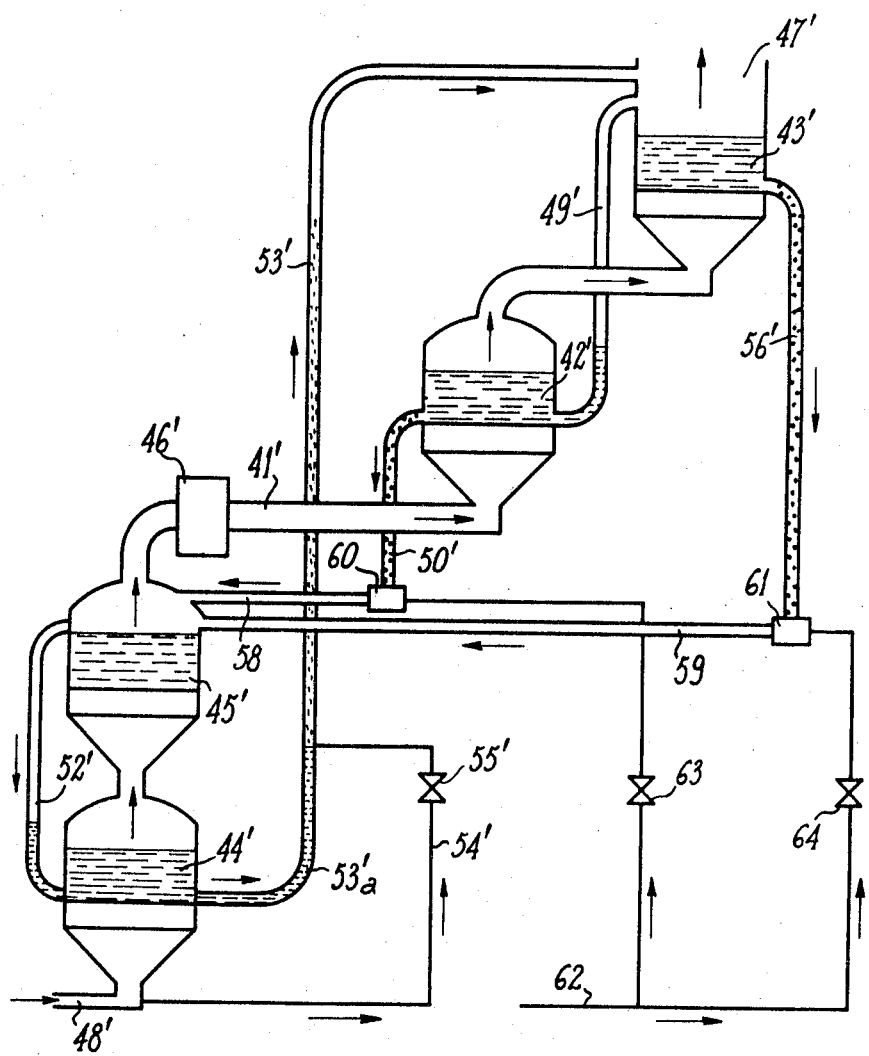
FIG. 3 is a modification of the unit of FIG. 2 but adapted to an MHD converter having a horizontal tuyere.

The arrangement illustrated in FIG. 1 comprises an air supply duct 1 connected through a diffuser 2 to a chamber having disposed thereacross a refractory porous or perforated partition 3. Overlying this partition 3 is the wall 4 of a space 5 in which a bottom fluidized bed 6 of refractory particles is shown.

Overlying the space 5 is a convergent duct 7 connecting this space with the burner and the MHD tuyere 8 consisting of a casing disposed vertically and of a length sufficient to hold the component elements of a magnetohydrodynamic converter. The lower section of this tuyere casing 8 is substantially at ground level.

A suitable frame structure 9 supports the duct 1 in a corresponding tunnel. Other frame structures 10 support the diffuser 2 and the base of wall 4. Complementary frame structures 11 carry and centre the upper portion of said wall 4 and also said convergent duct 7.

Relatively thick beams 12 support the tuyere 8 by means of transverse frame structure elements 13 together with the accessories, such as coil windings or else, of this generator, and as these accessories are no part of the present invention it is not deemed necessary to describe them in detail.

Uprights such as 14 are provided in the frame structure elements 13, for supporting an upper platform 15 upon which the bottom of a container 16 is laid. This container 16 encloses a space 17 receiving in its bottom another fluidized bed 18. The concave bottom 19 of container 16 has a central outlet orifice 20 of the tuyere casing 8 and overlying this outlet orifice 20 is a diffuser 21 cooled internally by a water circulation, this diffuser being supported above the bottom by blades 22 slightly inclined with respect to radial direction, all the gas circulation elements of this arrangement consisting of bodies of revolution.

Overlying the container 16 is a cupola 23 having connected to its centre a duct 24 merging into an exhaust duct 25.

Fuel is fed to the bottom of the tuyere casing 8 by means of a pipe 26, and another pipe 27 delivers thereto a certain quantity of primary combustion air, possibly with the addition of oxygen for enriching the combustion agent of which the secondary fraction is fed through said duct 1. The combustion products are exhausted through duct 25 to the seed recovery unit illustrated in FIG. 1a and to be described presently.

A vertical communication or column 28, heat-insulated like the above-described spaces, walls and containers, extends laterally from an orifice 29 leading from the junction of the concave bottom 19 with the cylindrical portion having vertical generatrices of container 16. This column 28 has its lower end connected to a pipe 30 leading into the space 5 overlying the fluidized bed 6. Lock chambers (not shown in the drawing) are provided in this column 28, if required by pressure conditions.

Another vertical communication or column 31 extends from the top of an elbow 32 having a narrowed lower or initial portion 33, in the opposite lateral portion of the fluidized bed 6. Another elbow 34 connects this passage to a tangential orifice 35 disposed nearly horizontally in the container 16, well above the fluidized bed 18.

In the column 28 a valve comprising a movable hollow, sliding, water-cooled member 36 is provided, this valve member 36 being actuated by means of a motor 37.

Likewise, in the narrowed lower portion 33 there is inserted the movable member 38 of another valve which is also hollow, cooled, slidably mounted and actuatable by means of a motor 39.

The duct 25 for exhausting the combustion products leads to a dilution unit (FIG. 1a) comprising a flue 67 surrounded by a jacket 68 of porous refractory material. In this flue 67 the combustion products are circulated and the dilution air is introduced into the flue through the refractory (see arrow F) and may be supplied from a compressor or the like. A separator 69 is provided at the outlet end of said dilution flue, the outlet 70 of this separator being connected to the tuyere of the generator for recycling the seed recovered as described hereinafter, the combustion products being discharged through the chimney 71.

This arrangement operates as follows:

In the case of an electric current generator consisting of an MHD converter, it may be specified that the operating conditions are such as to require a compressed-air pressure upstream of the tubular tuyere casing 8 of the order of 72 to 67 p.s.i. and a combustion temperature of about 3,000° K., with a flow rate of 800 to 900 meters per second, whereas the downstream pressure ranges from about 14 to 22 p.s.i., the smoke temperature at the ingress of diffuser 21 being of the order of 2,500° K. and the flow rate at the end of the tuyere is approximately 700 to 800 meters per second (2300 to 2600 ft./sec.).

Knowing that the natural combustion of commercial fuel in air does not permit of overstepping a temperature of the order of 2,250° K., for attaining the 3,000° K. necessary for the operation, the combustion air must be strongly heated.

This preheating is obtained by picking up heat from the combustion products as they flow through the fluidized bed 18 of which the hot particles (this heating being obtained by reducing from 2,500° K. to 2,000° K. the smoke temperature) flow down the column 28 in dense phase towards the fluidized bed 6.

The temperature of the particles feeding the fluidized bed 6 is therefore approximately 2,000° K. and the heat contained therein is transferred to the combustion air fed from the duct 1 through the porous wall 3 and fluidized bed 6 before it emerges through the space 5 and convergent duct 7 from the burner located at the base of the tuyere casing 8.

The thus cooled particles issuing from the lower fluidized bed 6 flow through the orifice 33 and then upwards in the diluted phase along the column 31, before being eventually recycled in the upper bed 18. Compressed air may be supplied to the bottom of this column 31 for facilitating the recycling of said particles.

The circulation of particles is obtained by previously closing the valve 36 or by using a double lock-chamber (not shown) so that the column 28 will be filled up. When a sufficient load is attained the weight of the particles overcomes in column 28 the upward thrust exerted by the pressure differential between enclosure 5 and enclosure 17. The valve 36 may be opened to permit the flow of particles towards the orifice 30 into the fluidized bed 6. The space 5 is sufficient for retaining the non-entrained particles in the tuyere or casing 8 of the MHD converter.

When the valve 38 of the upward transfer column 31 is opened the difference in pressure between the bed 6 and space 17 is such that a gaseous stream circulating at a speed higher than the particle driving speed is set up in said column 31, the particles being thus directed towards the bed 18. The space overlying this bed and its particle feed rate are sufficient to prevent the exhaust of particles through the chimney.

The possible pressure differential between the two fluidized chambers is therefore directly dependent on the vertical distance between these two beds, and also on the density of the particles.

However, it is also possible, according to an alternate form of embodiment (not shown) and if this vertical distance can or must be reduced, to install in the column 28, for the downward stream, another valve similar to the aforesaid valve 36 but at a somewhat higher level. Thus, a lock chamber is obtained which is charged when opening the upper valve while the lower valve is closed, this lock chamber being discharged by reversing the initial position of these valves, and subsequently re-charged by reversing again the valve setting.

To permit in general the priming of the particle circulation the inlet end of column 28 is at a lower level than bed 18. Similarly, the inlet of column 31 lies at a higher level than bed 6. To avoid any tendency of the particles to be entrained towards the duct 25 when the upper bed 18 is discharged, the orifice 17 provides a horizontal inlet disposed tangentially to the space overlying this bed.

It will be noted that this circulation produces between the two beds a particularly low leakage output which is less than 2% of the total output.

The gaseous combustion products enter the duct 25 leading to the dilution unit 67 at a temperature of the order of 2,000° K. The gas circulating along the porous walls 68 through which cold or relatively cold air is circulated are diluted and this dilution produces a sudden condensation of the seed-forming material without any risk of agglomerating or causing same to stick to the walls, since cold or relatively cold air is constantly directed therethrough. The ionising agents condense very rapidly in the solid state, thus neutralizng the aggressiveness which they might have if they occurred in the liquid state at some places on the material constituting the walls or jackets of the circuits of the plant. The recovered seed is then recycled, possibly after regenerating same in the tuyere 8 by means of the duct 70 while the smokes are exhausted through the chimney 71.

The regulation of the heat transfer unit is effected by properly positioning the valves 36 and 38. The valve 38 actuated by its motor 39 is open in order to keep the upper fluidized bed 18 at a constant temperature. The other valve 36 actuated by its servo-motor 37 is adapted to keep the lower fluidized bed 6 at a constant level. Thus, the circulation remains stable and cannot fail.

Considering the fact that the smoke exhausted from the tuyere casing 8 may contain ionizing seed likely to condense above 2000° K. and if it is desired to avoid the presence of its condensation products which are extremely corrosive with respect to the heat-insulating linings or lagging of space 17 and to the subsequent elbows and flues, the temperature of the bed 18 should not drop below 2000° K. The heat recovered from the smoke between 2500° G. and 2000° K. is transferred within the bed 6 to the air, the latter being thus heated from 1000° K. to 1800° K. and preheated before entering the duct 1 at the temperature of about 1000° K. by means of an ancillary recovery from the smokes, which ancillary recovery is obtained by means not shown in the drawings.

The temperature of the particles circulating between the two beds oscillates between 2000° K. and 1800° K., thus avoiding any excessive heat surges. These temperature values are still considerably lower than the point of conversion of conventional refractory materials, whereby these materials can safely be used for internal lagging purposes.

Regarding the choice of the particles, of which the diameter and density control the dimensions of the heat transfer unit (the larger the particles, the smaller the dimensions of the fluidized beds but the greater the particle fragility), zirconium or magnesia having a particle size of about 8 millimeters may be used. Under these conditions the heat transfer surface area exceeds 400 square meters per cubic meter of particles, and calculus proves that a bed thickness of 0.80 meter permits of practically equalizing the gas and particle temperatures.

In the upper fluidized bed 18 the intense stirring of said particles provides an almost perfect temperature homogeneity. Therefore, the temperature of the refractory materials lagging the bottom 19 and the walls of enclosure 16 should not exceed 2000° K. whereas the gas temperature at the level of orifice 20 is of the order of 2500° K. In this case the use of conventional refractory materials is also possible.

The cooled diffuser comprising inclined blades at its lower portion is adapted to impart a movement of rotation to the fluidized bed 18, thus preventing the formation of flues, throats or large bubbles therein. The height and length of these blades are so calculated that in the inoperative condition the particles constituting said fluidized bed form a slope having the angle of repose of these particles, thus preventing same from attaining the orifice 20. Above the diffuser 21 a fixed cap 40 of particles is built up and protects the diffuser.

Regarding the lower fluidized bed 6 as the air is introduced into this bed at a temperature of about 1000° K. it is preferable to construct the diffuser in the form of a pervious refractory partition 3 supported by a metal framework, so that the tubulence can be reduced. In certain other cases this bed could be suspended somewhat in the manner contemplated for the upper bed.

The space in which the lower bed operates is the seat of relatively high pressures and therefore it is advantageous to provide a double-walled or jacketed structure (not shown) to permit the circulation of a fluid under pressure between the walls thereof. This fluid may consist of cooling air adapted to transfer the strain-stress resistances from the inner wall to the cooled outer wall in order to improve its strength. Thus, the weight of the envelope of this fluidized bed may be reduced while recovering heat losses if this air is introduced into the combustion agent at a suitable stage of the thermal cycle imposed thereto.

The above-described arrangements permit of contemplating the construction of large units having very high power ratings, of the order of thermal 1000 MW, considering the heat transfer possibilities and the relatively reduced over-all dimensions of the regeneration system. The vertical disposal permits of eliminating junction flues as well as the relevant valves. The temperatures prevailing in the regeneration plant are those normally supported by conventional refractory and heat-insulating materials. The moderate temperature differences are well supported by the bed-forming granules. Furthermore, the regulation means contemplated permit of supplying without difficulty air at a constant temperature to the plant.

The above-described plant is thus capable of solving the two main problems arising from the operation of the converter, namely the obtaining of the relatively high temperatures necessary for operating this type of converter by using conventional fuels and combustion agents, on the one hand, and the plasma insemination in said converter with the recovery and recycling of the seed, in conjunction with a considerable reduction in the corrosive effects caused by the presence of such ionising substances at high temperatures in the smoke circuits, on the other hand.

In another form of embodiment of this invention, means are provided whereby the simultaneous heat recovery and seed recycling can be effected simultaneously in an MHD converter.

FIG. 2 illustrates diagrammatically at 41 the tuyere of a magneto-hydrodynamic converter of the vertical type. The smoke flows in succession through two fluidized beds 42 and 43 before being exhausted at 47. Similarly, the combustion air feed through a duct 48 will flow through another pair of fluidized beds 44 and 45 before penetrating into the burner 46.

As the chambers containing the fluidized beds and the other constructional details of the converter are otherwise the same as those described hereinabove with reference to FIG. 1, they are not reproduced in FIG. 2 and in the subsequent figures for the sake of simplification.

According to this invention, the particles flow downwardly by gravity from the fluidized bed 43 to the underlying fluidized bed 42 through the pipe 49. The inlet end of this pipe 49 is level with the top of the upper fluidized bed 43 and its outlet, formed in the lateral wall of the lower fluidized bed 42, lies beneath the top of this bed 42. Therefore, the excess particles of bed 43 flow automatically to the lower bed 42. The particles fluidized in the bottom of pipe 49 compensate the pressure differential between the inlet and outlet ends of the pipe, thus limiting the smoke leakage output.

The particles reheated in bed 42 by heat transfer effect with respect to the smoke flow downwards through a pipe 50 into the fluidized bed 45. The inlet orifice of this pipe 50 is located at the bottom of the enclosure containing said fluidized bed 42 and therefore under this bed, so that the pipe 50 is constantly loaded with particles. The weight of the particles contained in this pipe should exceed the upward pressure forces. A valve 51 is provided for limiting the particle output.

The particles then flow from the fluidized bed 45 to the underlying fluidized bed 44 through another pipe 52 having the same arrangement (notably the outlet and inlet) and operation as those of pipe 49.

The cold particles present in the fluidized bed 44 are returned to the enclosure containing the bed 43 through a lateral pipe 53. In the first section 53a of this pipe the particles are fluidized in dense phase. A supply of additional compressed air will then permit of fluidizing the particles in diluted phase and thus carry along these particles towards the top section of pipe 53. Additional compressed air is thus supplied through a pipe 54 taking air from the main supply duct 48 under the control of a valve 55.

Under these conditions, the circulation of particles between the four fluidized beds 42, 43, 44 and 45 is adjusted by means of valves 51 and 55. This particle circulation, considering the smoke and compressed-air outputs, permits of regulating the temperature of the fluidized beds.

If $T_c$ denotes the condensation temperature of the seed, $T_3$ being the temperature of the fluidized bed 43 and $T_5$ that of fluidized bed 45, the temperature of the fluidized beds may be so adjusted that:

$$T_3 < T_c$$
$$T_5 > T_c$$

Thus the seed contained in the smoke will condense itself in the fluidized bed 43 on the very considerable surface area provided by the particles constituting this fluidized bed.

According to a specific feature of this invention, another pipe 56 is provided for by-passing one fraction of the particles from bed 43 to bed 45. The operation and disposal of this pipe are similar to those of pipe 50. The seed-coated particles may thus be reheated in the fluidized bed 45, the seed is vaporized and re-introduced into the central tuyere casing 41.

The output of said pipe 56 is adjustable by means of a valve 57 with a view to obtain a sufficient insemination.

The device described hereinabove with reference to FIG. 2 comprises two series of each two fluidized beds, but it will readily occur to anybody conversant with the art that it would not constitute a departure from the spirit and scope of the invention to increase the number of these fluidized beds in order to improve the heat recovering or the condensation of the seed and subsequently its vaporization at a more adequate temperature.

If, considering the mutual characteristics and outputs of the fluids (air and smoke) the difference between $T_3$ and $T_5$ is not sufficient to ensure a complete condensation and vaporization of the seed, the fluidized bed 43 may be cooled by means of water and steam pipings, or alternately the temperature of the fluidized bed 45 may be increased by a direct injection of fuel burning within the fluidized bed proper.

The specific forms of embodiment described hereinabove with reference to FIG. 1 are applicable to a vertically disposed tuyere. Now for various reasons it may be desirable to dispose this tuyere horizontally. This disposal may on the other hand lead to a substantial reduction in the cost of the frame structures and also to a simplification of the general heat expansion problem concerning the plant.

FIG. 3 illustrates an exemplary form of embodiment of the device of this invention as applied to an MHD tuyere disposed horizontally. In this figure the elements similar to those depicted in FIG. 2 are denoted by the same reference numerals completed by the prime index (').

According to this form of embodiment the principle of operation remains unchanged, the only modification residing in the flow of particles through ducts 50' and 56'. The vertical lower end of these ducts open into a box, respectively 60 and 61, of substantially parallelepipedic configuration. The height of this vertical section is still such that the weight of the particles contained therein exceeds the force exerted by the air pressure.

The ducts 50' and 56' are connected respectively through pipes 58 and 59 to the enclosure containing the fluidized bed 45', and the particles are entrained in the diluted phase into the aforesaid bed 45' by an injection of compressed air directed respectively into said boxes 60 and 61. With this arrangement any mechanical component element can be dispensed with for limiting the output of hot particles.

The compressed air, at a pressure definitely higher than that of fluidized bed 45', is fed through a pipe line 62. Valves 63 and 64 are provided for adjusting the compressed-air outputs at 60 and 61 respectively, and permit of regulating the particle output in the pipes 58 and 59 respectively.

It will be noted that a similar arrangement of the columns or pipes may be incorporated in the vertical tuyere arrangement shown in FIG. 2. This characteristic feature may be advantageous in that it permits of dispensing with the valves 51 and 57 of FIG. 2 and to make the difference in height between the fluidized beds 42 and 45 independent of the difference in pressure between these two beds.

This invention is also concerned with specific forms of embodiment of the fluidized-bed diffusers utilized in the arrangements described hereinabove with reference to FIGS. 2 and 3.

From the constructional piont of view these diffusers and notably those associated with the fluidized beds 42 and 43 are the most delicate component elements of the plant, as the smoke penetrates into the bed 42 at a temperature of the order of 2300° C. The form of embodiment of this invention which is described hereinafter with reference to FIGS. 4 and 5 of the drawings is particularly adequate in the case of an arrangement incorporating a horizontal tuyere.

The parallelepipedic configuration of the nozzle or tuyere T is connected to, or merges into, the cylindrical shape of enclosure E containing the fluidized bed LF through a connecting section R having a shape clearly visible in FIG. 5. The lower portion of the fluidized bed LF consists of a honeycomb structure of refractory bricks B so disposed that it will direct in a most homogeneous manner the gaseous streams vertically throughout the surface area of the fluidized bed, as shown diagrammatically by the arrows in FIG. 4.

These bricks are covered in turn by a layer M of refractory materials disposed at random or loosely, the granulometry of these materials decreasing towards the top of the fluidized bed LF. However, the finest particles will have such dimensions that they cannot be fluidized with the material constituting the fluidized bed proper.

Thus, the gaseous diffusion will be effective through a particularly sturdy structure. The fixed bed M having a granulometry decreasing from bottom to top will retain the fluidized particles in case the plant were held up.

The devices according to this invention are characterized by many advantageous features, inter alia:

The great heat-transfer surface area provided by the fluidizing particles affords a considerable reduction in the heat-transfer volume or over-all dimensions;

The re-heated air may be kept at a very high and constant temperature;

The specific disposal of fluidized beds permits of dispensing with any high-temperature flues.

The use of stop valves or reversing valves can be eliminated from both smoke and reheating air circuits due to the particular kind of heat recovery implemented.

The seeds are recycled in the tuyere of the MHD converter in a particularly simple manner, with a minimum loss of heat.

Of course, this invention should not be construed as being limited by the specific forms of embodiment shown and described herein which are given by way of example only, since many modifications and variations may be brought thereto without departing from the basic principles of the invention as set forth in the appended claims.

What is claimed is:

1. A method for the simultaneous recovery of heat and recycling of feed substance in a magneto-hydrodynamic converter, which comprises the steps of taking the heat from the combustion products in a first series of fluidized beds at the outlet end of the converter tuyere, transferring the particles constituting said fluidized beds from said first series of fluidized beds to a second series of fluidized beds disposed at the inlet of said tuyere, before the burner, through the fluidized beds of said second series, transferring the particles from the fluidized beds of said second series back to the fluidized beds of said first series, and simultaneously with the heat recovery thus accomplished, condensing the seed in one of said fluidized beds of said first series, and transferring said seed into one of the fluidized beds of the second series for reheating and subsequently vaporizing said seed, and finally re-introducing said seed into said tuyere, 2. A device for carrying out the method disclosed in claim 1, which comprises a first series of fluidized beds disposed at the outlet end of the tuyere of said converter, and a second series of fluidized beds disposed at the inlet end of said tuyere, before said burner, wherein said first series of fluidized beds consists of two fluidized beds disposed vertically one above the other, therefore at different levels, said second series comprising likewise two fluidized beds disposed like those of said first series, the arrangement being such that the particles circulate by gravity from the upper bed to the lower bed and under the thust of compressed air in the reverse direction.

3. A device as set forth in claim 2, wherein the column provided for the downward circulation of particles from the upper fluidized bed to the lower fluidized bed of said first series has its inlet end located at the top of the enclosure containing said upper bed and its outlet located below the level of said lower bed, the weight of the particles filling the lower portion of said column compensating by gravity the pressure differential obtaining between the inlet and outlet ends of said column, thus limiting the leakage output of the smoke.

4. A device as set forth in claim 2, wherein the column for circulating the particles from the lower fluidized bed of the first series to the upper bed of the second series has its inlet located below the level of said lower bed and its outlet located above the level of said upper bed, and valve means interposed in said column for limiting the particle throughput therein.

5. A device as set forth in claim 2, wherein the flow of particles from said upper fluidized bed of said second series to said lower bed of said second series takes place through a column designed to operate like the column interconnecting the enclosures containing said fluidized beds of said first series.

6. A device as set forth in claim 2, wherein means are provided for transferring the seed condensed on the particles of said upper bed of said first series into the enclosure, where it is adapted to be heated and vaporized, of said upper fluidized bed of said second series, said means consisting of a column comprising valve means for adjusting the seeding of the smokes at a sufficient degree.

7. A device as set forth in claim 6 designed for a horizontal tuyere disposal, wherein the lower ends of the vertical sections of said columns for circulating particles respectively between the fluidized beds of said first series and the upper bed of said second series are interconnected by other sections in which said particles are adapted to be entrained in the diluted phase by means of an injection of compressed air.

8. A device as set forth in claim 7, wherein the lower portion of said fluidized beds consist of a honeycomb structure of refractory bricks so disposed as to direct vertically and homogeneously the gaseous streams through the surface area of said beds, said brick structure being covered by a layer of loosely disposed refractory materials having a granulometry decreasing towards the top of the bed.

9. A device as set forth in claim 8, wherein the dimensions of the finest portions of said layer of refractory materials are such that they cannot be fluidized with the material constituting the fluidized bed proper.

10. A method as set forth in claim 1, which comprises the step of injecting liquid fuel adapted to burn within the upper fluidized bed of said first series for increasing the temperature of said bed.

11. A method as set forth in claim 1, comprising the step of cooling said upper fluidized bed of said first series, if considering the mutual characteristics and outputs of the fluids air and smoke, the difference between the temperature of said upper fluidized bed of said first series and the temperature of said upper fluidized bed of said second series is not sufficient to ensure a complete condensation and vaporization of the seed.

12. A method of heat regeneration and de-insemination, notably for combustion plants and more particularly for generators of electric current operating by magneto-hydrodynamic effect, comprising the steps of picking up the heat contained in the combustion products by a fluidized bed disposed at the outlet of the combustion plant, transferring the particles constituting said first bed into a second fluidized bed disposed at the inlet of said plant, causing at least one combustion agent to flow through said second bed, returning the particles of said second bed to said first bed, the de-insemination of the combustion gas, when the combinations of the seed with the combustion gas yields a product which in the liquid phase has a corrosive action on refractories, being obtained at the outlet of said first fluidized bed by effecting a very rapid tempering of said products causing the seed to be converted almost instantaneously from the gaseous state to the solid state, which is subsequently separated from the combustion gas in a cyclone.

13. A method as set forth in claim 12, wherein at least the return flow of the particles from said second bed to the first takes place continuously.

14. A method as set forth in claim 12, wherein said particles circulation takes place on the one hand by gravity in the dense phase and on the other hand by gaseous entrainment in the diluted phase.

15. A method as set forth in claim 12, comprising the steps of picking up said particles from within the fluidized beds at a lower level than the surfaces of said beds and returning same thereto by pouring the particles over said surfaces.

16. A method as set forth in claim 12, comprising the steps of subjecting the particles circulations to regulating means responsive to the temperature of the hottest bed for feeding said last-named bed, and to the level of the coldest bed for feeding said coldest bed.

17. A device for effecting a heat regeneration and de-insemination, notably in combustion plants and more particularly in a magneto hydrodynamic converter which comprises: an air supply duct connected through a diffuser to a chamber having disposed thereacross a perforated partition with a casing overlying said partition, a convergent duct overlying said casing and connecting it with a burner and a blast pipe, a container disposed above said blast pipe, a lower fluidized bed into the casing overlying said partition for the admission of one combustion agent, an upper fluidized bed for discharging the combustion products disposed in said container, ducts interconnecting said two fluidized beds permitting a continuous circulation of particles, one of said ducts constituting the descending column and the other the ascending column, an adjustable valve located at the lower portion of said descending column, an adjustable valve located on said ascending column and means for recovering the seed material from the combustion products and transfer it into said upper fluidized bed.

18. A device for effecting a heat regeneration and de-insemination, notably in combustion plants and more particularly in a magneto hydrodynamic converter which comprises: an air supply duct connected through a diffuser to a chamber having disposed hereacross a perforated partition with a casing overlying said partition, a convergent duct overlying said casing and connecting it with a burner and a blast pipe, a container disposed above said blast pipe, a lower fluidized bed into the casing overlying said partition for the admission of one combustion agent, an upper fluidized bed for discharging the combustion products disposed in said container, ducts interconnecting said two fluidized beds permitting a continuous circulation of particles, one of said ducts constituting the descending column and the other the ascending column, an adjustable valve located at the lower portion of said descending column, an adjustable valve located on said ascending column, means for recovering the seed material from the combustion products and transfer it into said upper fluidized bed and a diffuser for feeding said upper fluidized bed, said diffuser being cooled and provided with inclined blades adapted to impart a movement of rotation to said bed particles.

19. A device as set forth in claim 18, wherein said adjustable valves comprise a movable hollow, sliding, water-cooled member and a motor for actuating said water-cooled member.

20. A device as set forth in claim 18 wherein means are provided for diluting the combustion products with the assistance of a cold fluid which consists of a flue provided with porous refractory walls, means being also provided for directing the combustion products loaded with seed materials through said refractory walls, further means being provided for blowing cold air through said walls and thus cause said materials to be converted directly from the gaseous state to the solid state without reactiveness and without any risk of causing said materials to stick to said walls.

References Cited

UNITED STATES PATENTS

| | | | |
|---|---|---|---|
| 2,856,271 | 10/1958 | Bailey et al. | 263—19 X |
| 3,185,457 | 5/1965 | Boll et al. | 263—19 |
| 3,223,860 | 12/1965 | Brill | 310—11 |
| 3,303,364 | 2/1967 | Hals | 310—11 |

OTHER REFERENCES

Direct Generation of Electricity, edited by K. H. Spring; copyrigted in 1965 by Academic Press, London: Chapter by Swift-Hook, pp. 70 and 176.

DAVID X. SLINEY, Primary Examiner